United States Patent
Herwig et al.

[11] Patent Number: 5,905,206
[45] Date of Patent: May 18, 1999

[54] METHOD AND APPARATUS FOR MAGNETO-INDUCTIVE FLOW MEASUREMENT

[75] Inventors: Jörg Herwig, Adelebsen; Klaus Schäfer, Hannoversch Münden, both of Germany

[73] Assignee: Bailey Fischer & Porter GmbH, Goettingen, Germany

[21] Appl. No.: 08/862,780

[22] Filed: May 23, 1997

[51] Int. Cl.$^6$ ........................................ G01F 1/58
[52] U.S. Cl. ........................................ 73/861.12
[58] Field of Search .............. 73/861.12, 861.17, 73/861.18

[56] References Cited

U.S. PATENT DOCUMENTS

| | | | |
|---|---|---|---|
| 4,159,645 | 7/1979 | Cushing | 73/194 |
| 4,262,543 | 4/1981 | Grebe, Jr. et al. | 73/861.17 |
| 4,370,892 | 2/1983 | Schmoock | 73/861.12 |
| 4,704,907 | 11/1987 | Mannherz | 73/861.17 |
| 5,325,728 | 7/1994 | Zimmerman et al. | 73/861.12 |

*Primary Examiner*—George Dombroske
*Assistant Examiner*—Jewel V. Thompson
*Attorney, Agent, or Firm*—Michael M. Rickin

[57] ABSTRACT

Magneto-inductive flow measurement using a pulsed and/or reversing pulsed constant field wherein the measurement voltage which is induced by the flow, running transversely with respect to the magnetic field, of the measurement medium in the measurement tube of the magneto-inductive flowmeter is sampled in each clock time interval when the coil current is applied, even if the magnetic field has not yet reached its steady-state. Empirically determined correction values are used to correct the samples to the situation when measurements are carried out with a steady-state magnetic field. Calibration measured values can be recorded in a steady-state magnetic field from time to time, in order to check and, if required, to correct the correction factors. The coil current can be switched at frequencies which alternate with one another in time, the number of periods of the mutually alternating period sequences being varied in an irregular manner.

27 Claims, 3 Drawing Sheets

METHOD AND APPARATUS FOR MAGNETO-INDUCTIVE FLOW MEASUREMENT

FIELD OF THE INVENTION

This invention relates to a method and apparatus for measuring the flow rate of a medium and more particularly to those magneto-inductive flowmeters with pulsed or reversing pulsed constant field production.

DESCRIPTION OF THE PRIOR ART

A distinction is essentially drawn between two types of magnetic field production in magneto-inductive flowmeters, namely magnetic-field production in the form of a pulsed or switched (reversing pulsed) constant field, and magnetic field production in the form of a sinusoidal alternating field.

The pulsed (or reversing pulsed) constant field production is distinguished by the fact that it is possible to achieve a stable zero and a stable measurement range for the measured signal. However, because of unavoidable inductances and losses in the coil field circuit, the respective steady-state value $B_0$ of the B field occurs with a delay relative to the field current switching times when a pulsed constant field is produced, although not until after a rise time has elapsed. This problem has until now been circumvented by choosing the field current switching frequency to be so low that it was possible for the magnetic field B to reach the steady state in each clock time interval when the coil current was applied, and in that the measurement voltage between the measurement electrodes was detected only in the time intervals when the magnetic field was in the steady state. The respective rise times in the clock cycles when the coil current is applied are in this case not used to detect the measurement voltage. The measurement is sampled in an appropriate manner therein.

For the reasons mentioned above, the magneto-inductive flowmeters which have been operated until now based on the principle of the magnetic field being produced by a pulsed or reversing pulsed magnetic field were comparatively inert, so that their area of use has essentially been limited to standard flow measurement tasks, for example in the field of water supply and sewage. Flow measurements with a switched or reversing switched constant field are also already used for monitoring liquid metering processes which take place relatively slowly.

The operation of magneto-inductive flowmeters based on the principle of the magnetic field being produced in the form of a sinusoidal alternating field, in particular synchronized with the mains, has the advantage that the measurement voltage can be measured without interruption at a high sampling rate, so that flow changes can be detected relatively quickly. Such fields of use for the operation of magneto-inductive flowmeters with sinusoidal alternating field production are, for example, the monitoring of short metering processes, flow measurements of multi-phase measurement substances, paper substances and fruit mixtures, as well as flow measurements with comparatively severely fluctuating flows, such as those which occur during operation with piston-type pumps.

However, in the case of magneto-inductive flowmeters with sinusoidal alternating magnetic field production, a problem which arises is the instability of the zero and measurement range, as well as the problem of disturbances resulting from electromagnetic interference in synchronism with the mains.

SUMMARY OF THE INVENTION

The object of the invention is to indicate ways by means of which the available measurement information can be used more efficiently in a magneto-inductive flowmeter with pulsed or reversing pulsed constant field production in order to achieve, in particular, better resolutions or a faster reaction of the magneto-inductive flowmeter.

In the case of the method as claimed in claim 1, the time period which is used to record measurement information occurs in the respective clock time intervals when the coil current is applied, even though the magnetic field has not yet reached its steady state in this period.

The sampling of the measurement voltage in the clock time intervals when the coil current is applied can be controlled such that a plurality of samples of the measurement voltage are taken in each clock time interval. The samples which are detected during the time periods in which the magnetic field has not yet reached its steady state can be corrected by means of correction factors, in order in this way to correct the respective measurement voltage for the situation of measurement with a steady-state magnetic field. The measurement voltage in a steady-state magnetic field is, to a good approximation, proportional to the flow rate to be determined. Each measurement voltage value recorded in the time period when the magnetic field is not (yet) in the steady state is assigned a correction factor which depends on the measurement time of the measured value within the relevant clock time interval when the coil current is applied. The correction factors may be determined, for example, by calibration measurements or system parameter measurements, and can be stored in a memory of an evaluation device.

The measurement mode described above permits a comparatively high sampling rate, it being possible to use each clock time interval when the coil current is applied essentially in its entirety for recording measured values. The relevant measurement system can react relatively quickly to flow changes, so that applications become feasible which, until now, have been the reserve of measurement operation with sinusoidal alternating field excitation.

It should be mentioned that, particularly in the case of reversing pulsed constant field production, in which the direction of the magnetic field is alternately reversed, it is possible to work with coil field current clock time intervals which are shorter than the rise time which the magnetic field requires in order to reach the steady state. The coil field current switching frequency can thus be correspondingly increased in comparison with conventional magneto-inductive flowmeters.

Another measurement mode based on the method according to the invention provides that only one voltage measured value is detected in each clock time interval when the coil current is applied, whose sampling integration time interval (measurement time window) is, however, so large that it preferably covers virtually the entire time period of the relevant clock time interval. In order to estimate the measurement voltage for the situation in which measurement is carried out with a steady-state magnetic field, the relevant measured values are normalized or corrected using correction factors, the correction factors depending on the length of the sampling integration time interval (measurement time window) and the relative position of the sampling integration time interval within the relevant clock time intervals. Once again, in the latest measurement mode mentioned, it is unnecessary for the clock time intervals when the coil current is applied to be respectively selected to be so long that the magnetic field reaches its steady state.

According to a development of the invention, the coil field current is switched at at least two mutually alternating switching frequencies, the clock time intervals at one of these frequencies being sufficiently long for a steady-state magnetic field to be formed. In these (longer) clock time intervals, the measurement voltage is recorded when the magnetic field is in the steady state, in order to provide calibration values which can be used to check the correction values mentioned above and if required correct those values. If the measurement voltage values estimated using the correction factors deviate systematically over a predetermined time from the corresponding calibration factors, then the correction factors are corrected, in order to improve the estimates.

When measurements are carried using in each case one sample per clock time interval when the coil current is applied, corresponding calibration values can be obtained by reducing the sampling integration time interval for recording measured values in sufficiently long clock time intervals and using only the time period in which the magnetic field has reached its steady state.

The method in which the coil field current is switched at at least two different switching frequencies, which alternate with one another in time, and the measurement voltage is sampled with a predetermined time relationship to the respectively preceding coil field current switching time in the clock time intervals when the coil current is applied is particularly important. An additional special feature is that the number of periods in the period sequences of the mutually alternating switching frequencies is varied in an irregular manner. This aspect has its own importance in the context of the invention.

The measurement method described above is particularly suitable for use in periodically fluctuating flows, as can be caused, for example, by piston-type pumps or the like in the feed circuit of the medium which can flow.

Specifically, if a periodically pulsating flow profile is sampled at a constant frequency (or at two mutually periodically alternating fixed frequencies), then, with the measured value sampling and periodic flow change synchronized in time, it is possible for a beat frequency behavior to occur, and thus a systematic error in the output signal (a signal which is averaged over a number of samples) which preferably indicates a mean flow rate, in a magneto-inductive flowmeter.

The foregoing measurement operation ensures that the measured value detection is never synchronized to periodic flow changes over a relatively long time, so that systematic erroneous measurements caused by beat-frequency effects are avoided.

Two frequencies are preferably selected which have no common harmonics.

The number of respective periods in the mutually alternating period cycles of the various switching frequencies can be selected statistically from a predetermined numerical range, for example by means of a random number generator.

A magneto-inductive flowmeter for measuring the flow rate of a medium that can flow. The flowmeter has a measurement tube through which the medium flows the flowmeter also has an electromagnetic coil arrangement for producing a magnetic field transversely with respect to the flow direction of the medium and two electrodes for measuring a measurement voltage which is caused by the flow of the medium which can flow running transversely with respect to the magnetic field. The flowmeter further has a measured value detection device which includes a DC source for providing a field current for the electromagnetic coil arrangement; a switch device which pulses the coil field current; a programmable control circuit which controls the switch device; a measured value integrator which samples the measurement voltage in clock time intervals which occur when the electromagnetic coil field current is applied the sampling occurring even during a time period in which the magnetic field which attempts to reach a steady state in accordance with a characteristic time function after each changeover of the electromagnetic coil field current has not yet reached the steady state; and an evaluation device which evaluates the measurement voltage samples in order to determine the medium flow rate. The duration of the sampling integrator clock time intervals and/or the timing of the sampling integration time intervals relative to the switching times of the electromagnetic coil field current is adjustable under the control of the programmable time control circuit.

DESCRIPTION OF THE PREFERRED EMBODIMENT(S)

Figure 1:
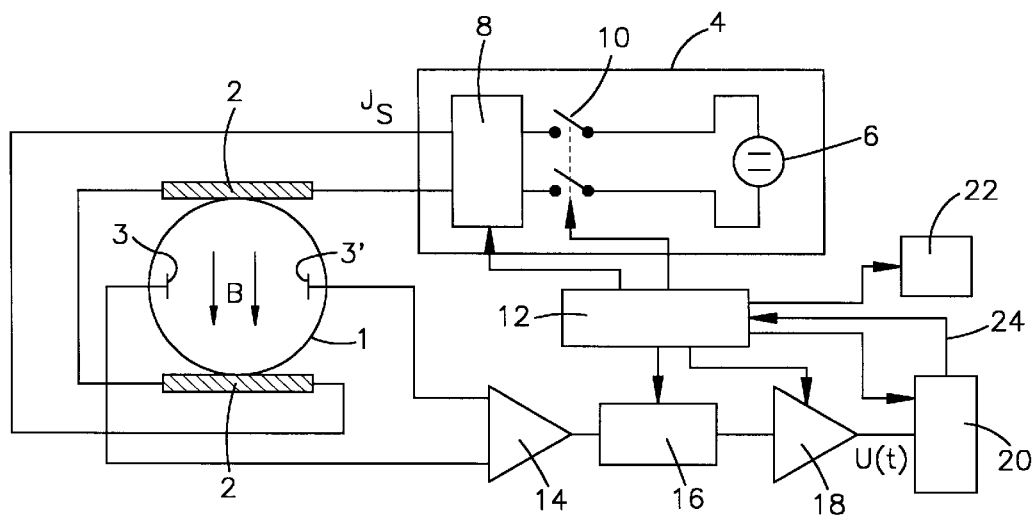
FIG. 1 uses a block diagram to show a magneto-inductive flowmeter according to the invention.

FIG. 1 uses a block diagram to show a magneto-inductive flowmeter according to the invention. The flowmeter has a measurement tube 1, an electromagnetic coil arrangement 2 for producing a magnetic field (induction flux density B) passing through the measurement tube 1, as well as a pair of measurement electrodes 3, 3', which are designed to be electrically in contact with the medium flowing through the measurement tube 1, said medium being electrically conductive at least to a minor extent. The assembly 1, 2, 3, 3' is of a conventional design. A measurement voltage which can be picked off via the electrodes 3, 3' is induced by the flow, running transversely with respect to the magnetic field, of the medium which can flow.

When the B field is in the steady state, the measurement voltage picked off via the electrodes 3, 3' is directly proportional,, to a good approximation, to the flow rate Q of the medium which can flow, in the tube 1.

However, measurements carried out with the B field in the steady state for a relatively long time are subject to errors. Magneto-inductive flowmeters are thus frequently operated with a pulsed or switched constant field, the driver current J for the coil arrangement being switched on and off or reversed periodically, in order to switch the magnetic field on and off, or reverse its direction, in a corresponding manner.

The present invention also makes use of the principle of a pulsed magnetic field.

In the flowmeter illustrated in FIG. 1, the coil arrangement 2 is connected to a controllable driver circuit 4 which supplies the field current I for the coil arrangement 2. The driver circuit 4 includes a DC source 6 for the coil arrangement 2, a controllable reversing bridge circuit 8, which is supplied from the DC source 6, for selectively changing the current flow direction of the coil current I, and a controllable on/off switch 10 for selectively interrupting the coil current I.

The driver circuit 4 is connected to a control and evaluation device 12, which monitors the functions of the reversing bridge circuit 8 and of the switching device 10 in a programmed or programmable manner, under microprocessor control. The control and evaluation device 12, in conjunction with the driver circuit 4 thus monitors the process of switching the magnetic field B on and off, and the duration of the following states: magnetic field switched on and magnetic field switched off, and the direction of the magnetic field in the measurement tube 1.

On the measured value detection and evaluation side, the flowmeter according to FIG. 1 has an input amplifier 14 connected to the measurement electrodes 3, 3', a low-pass filter 16 connected downstream of the input amplifier 14 and having a selectively programmable cut-off frequency, an analog amplifier 18 connected downstream of the low-pass filter 16, a measured value integration stage 20 connected downstream of the analog amplifier 18 and having an adjustable sampling integration time interval, the control and evaluation device 12, and a display unit 22. The control and evaluation device 12 monitors the adjustable cut-off frequency of the filter 16 and the gain of the analog amplifier 18.

The control and evaluation device 12 is furthermore set up such that it can monitor the duration of the sampling integration time intervals of the measured value integrator 20 and the timing of the sampling integration time intervals relative to the switch events of the driver circuit 4.

The control and evaluation device 12 receives digitized measured values from the measured value integrator 20, via the data line 24. An evaluation routine in the control and evaluation device 12 evaluates the digital measured values from the measured value integrator 20 in order to determine flow rate values, and indicates the, possibly averaged, flow rate by means of the display 22.

The voltage signal U(t) which is applied to the input of the measured value integrator 20 corresponds to the detection voltage between the measurement electrodes 3, 3', said detection voltage having had high-frequency interference removed from it by the filter 16 and having been subsequently amplified by the amplifier 18.

Figure 2:
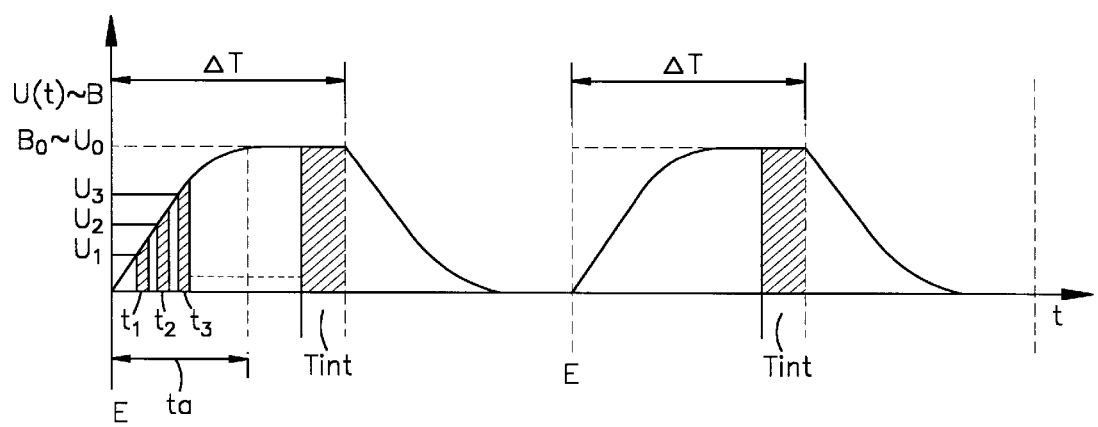
FIG. 2 uses a simplified diagram to show a characteristic time response of the measurement voltage and of the magnetic field in the clock time intervals when the coil current is applied, and the possibility of multiple sampling of the measurement voltage in the clock time interval.

In order to explain the invention further, the following text initially makes reference to FIG. 2.

FIG. 2 shows a qualitative illustration of the time response of the magnetic field B in the case when the coil current is switched on and off periodically. When the flow rate of the measurement medium is constant, the time waveform of the voltage U(t) which is applied to the measured value integrator 20 corresponds qualitatively to the time waveform of the B field. Because of unavoidable inductances and losses in the coil field circuit, the steady-state value $B_0$ of the B field is delayed relative to the times E when the current is switched on, but not until after a rise time $t_a$ has elapsed. As mentioned, the detection voltage U(t) which is applied to the measured value integrator 20 behaves in a corresponding manner with a constant flow rate.

In order to circumvent the problem of the finite setting time of the steady-state magnetic field within the clock cycles $\Delta T$ when the coil current is applied, the switched-on clock cycles $\Delta T$ have until now been selected to be sufficiently long that it has been possible for B, and thus U(t) to reach the steady state $B_0$ and $U_0$, respectively. The measurement voltage was then in each case recorded at the end of the clock cycles $\Delta T$ when the coil current was applied, over a sampling integration time interval $T_{int}$, as is indicated in FIG. 2. In the case of this conventional procedure, the clock frequency of the magnetic field is limited, as can be seen, since it is necessary to wait for it to reach the steady state in each clock cycle. Furthermore, only a limited time period $T_{int}$ is used in each clock cycle $\Delta T$ for actual detection of measured values.

The invention is based on the idea of obtaining and evaluating measurement information from the detection voltage U(t) even in the time period ta when the B field has not yet reached the steady state. Sample measurements with a constant flow rate have shown that the steady-state magnetic field and, in a corresponding manner, the detection voltage U(t) as well build up with a characteristic time response which is dependent on the magnetic field system and can be determined by calibration and/or system parameter measurements.

If the basic time response B(t) for building up the steady-state field Bo and, in a corresponding manner, the time response U(t) for building up the steady-state voltage $U_0$ are known, then, even during the rise time $t_a$, measured values $U_i$ of the voltage U(t) recorded at specific times $t_i$ can be used to determine the flow rate of the medium which can flow, in the measurement tube 1. If, for example, the steady-state value $U_0$ of the measurement voltage occurs in accordance with the step-function response characteristic of a first-order linear system with the time response:

$$U(t)=U_0 (1-e^{-e/\tau})$$

in each clock cycle $\Delta T$ when the coil current is applied, then a voltage value $U_i$ measured at the time $t_i$ is given by:

$$k_i U_i = U_0 \text{ where}$$

$$k_i = 1/(1-e^{-t_i/\tau}).$$

If the time constant $\tau$ is known, it being possible to determine this by system parameter measurements, the individual measurement times $t_i$ are thus assigned correction factors $k_i$ which can be used to estimate the respectively sought steady-state values $U_0$, which, to a good approximation, are proportional to the determined flow rate, from the voltage values $U_i$ measured at the times $t_i$.

In the case of the flowmeter in the present invention, the control and evaluation device 12 controls the time sequences of the circuit for the coil field current, the recording of measured values and, furthermore, the numerical evaluation of the measurement results. It defines, in particular, the times $t_i$ when the measured values are recorded by the measured value integrator 20 relative to the switching times of the coil field current I, and the duration of the respective integration time intervals for recording the measured values $U_i$, under program control.

The flowmeter according to the invention as shown in FIG. 1 allows different measurement modes to be carried out for determining the flow rate, subject to the premise that the available measurement information is used better than in the past. Preferred measurement modes are explained in the following text.

1. Measurement mode 1

Figure 3:
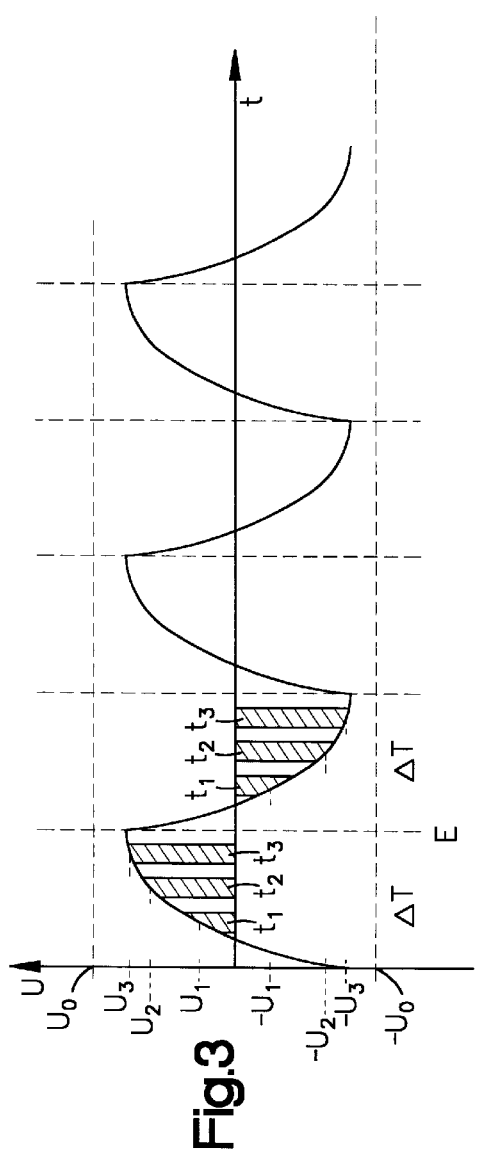
FIG. 3 uses an explanatory diagram to show the waveform of the measurement voltage for reversing pulsed constant field production, and the possibility of multiple sampling per field current clock time interval.

The control and evaluation device 12 controls the reversing bridge circuit 8 in such a manner that the current direction of the coil field current I is periodically reversed at a frequency f of, for example, 25 Hz. FIG. 3 illustrates an example of a qualitative waveform of the voltage U(t) applied to the measured value integrator 20 in this case. In the case of FIG. 3, it is assumed that the switching frequency of the coil field current I is so high that the voltage U(t) does not reach the steady state $U_0$ or $-U_0$.

The measured value integrator 20 samples the voltage U(t), controlled by the control and evaluation device 12, at the times $t_1, t_2 \ldots t_n$ in each half-cycle $\Delta T$, and emits corresponding digitized measured values $U_1, U_2 \ldots U_n$ to the control and evaluation device 12, via the data line 24. The control and evaluation device 12 stores correction factors $k_i$ which are assigned to the relevant measurement time $t_i$ in the manner already described above. For evaluation, the measured values $U_1, U_2 \ldots U_n$ are multiplied by the relevant correction factors $k_1, k_2 \ldots k_n$ in order to estimate the relevant values $U_{01}, U_{02} \ldots U_{0n}$. In order to estimate a standard steady-state value $U_0$ or $-U_0$ for the relevant half-cycle $\Delta T$, the control and evaluation device 12 can form a mean value from the determined values $U_{01} \ldots U_{0n}$. In order to eliminate offset errors, the control and evaluation device 12 is furthermore able to subtract the value $-U_0$ estimated in each period $2\Delta T$ from the value $+U_0$ estimated in the same period.

As can be seen from FIG. 3, the available measurement information is used optimally without the previous waiting times of conventional flow measurement systems with a switched constant field. Since there is no need to wait for the magnetic field to reach the steady state after the coil current has been switched, it is possible to work at a correspondingly higher current switching frequency, which makes it possible for the flowmeter according to the invention to react more quickly to flow changes. Relatively accurate measurement results are obtained in this case if the flow rate is essentially constant over at least one period $2\Delta T$.

The correction factors $k_i$ can be determined empirically by means of calibration measurements, and depend on the respective response function of the excitation system for the magnetic field to the coil current being switched on and off and being reversed.

If required, measurement mode 1 can also be operated at a lower current switching frequency, so that the magnetic field B and the measurement voltage U can reach the steady state in each half-cycle $\Delta T$. Even though this does not result in any significant shortening of the current switching periods $2\Delta T$ compared to conventional magneto-inductive flow measurement systems, the available measurement information is nevertheless used better, since measurement results which can be evaluated are obtained even during the unavoidable rise time of the magnetic field B. The measured values $U_0$ recorded after reaching the steady state can be used by the control and evaluation device 12 to check and, if required, to correct and to update the correction values $k_i$ in order, for example, to take account of changes to the correction values $k_i$ resulting from temperature changes.

The measured values $U_i$ recorded using measurement mode 1 can also be evaluated in the alternative manner explained below, in order to obtain results relating to the flow rate.

In this alternative evaluation method, during the compensation calculation, the control and evaluation device 12 carries out a curve matching process, based on the measured values $U_i$, using the least-squares fit method.

If, for example, the detection voltage U(t) follows a function in the algebraic form: $U(t)=U_0(1-e^{-t/\tau})$ then such a best-fit calculation can be used to estimate optimally not only the parameter $\tau$ (time constant) but also the sought value $U_0$.

However, it should be mentioned that this evaluation variant also operates with system response functions other than those quoted by way of example above, provided the general algebraic form is known.

2nd Measurement mode

The second measurement mode, which will be explained with reference to FIG. 4, does not differ in terms of the time control of the magnetic field B from the first measurement mode, which was explained with reference to FIG. 3. However, in contrast to the first measurement mode, the voltage waveform U(t) is not sampled with a plurality of measured values per half-cycle $\Delta T$, but one measured value U is in each case recorded per half-cycle $\Delta T$, a very long sampling integration time interval $T_{int}$ being selected, however, for the integration of the relevant measured values. Since the sampling integration time interval $T_{int}$ (also) extends over a region of the rise time ta in which the voltage has not yet reached the steady-state value $U_0$, the relevant measured values U must be corrected, using a correction factor, in order to estimate the value $U_0$. The relevant correction factor k depends on the length of the sampling integration time interval $T_{int}$, and on the relative position of the sampling integration time interval $T_{int}$ within the relevant half-cycle $\Delta T$, and can be determined empirically by calibration measurement. Corresponding correction factors are stored in a memory in the control and evaluation device 12.

In the second measurement mode as well, the available measurement information is used optimally, while avoiding waiting times.

Figure 4:
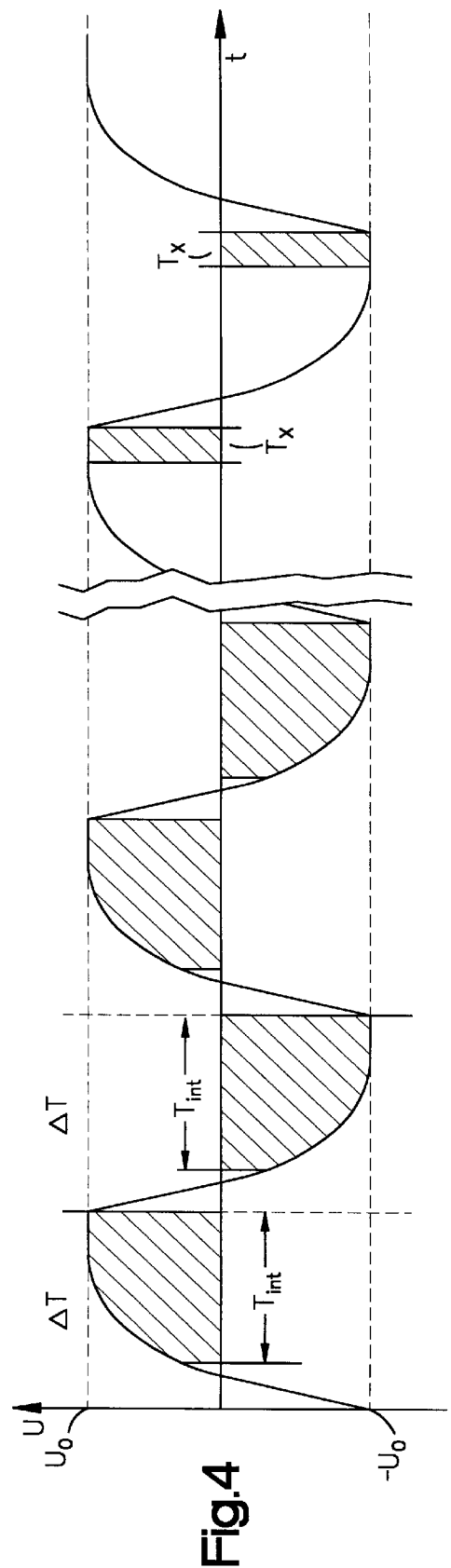
FIG. 4 uses an explanatory diagram to show the time waveform of the measurement voltage and the possibility of individually sampling each clock time interval, using a long sampling integration time interval.

If the second measurement mode is carried out using a current switching frequency at which the detection voltage U(t) can reach the steady-state value $U_0$ in each case, it is proposed that the sampling integration time interval $T_{int}$ be reduced from time to time in a number of periods $2\Delta T$, and be located exclusively in the steady-state region, as is indicated at $T_x$ in FIG. 4. The steady-state measurement voltage values $U_0$ determined in this case can be used to correct or to update the correction factors k mentioned above, in order to take account of any changes in the correction factors, for example because of changes in the temperature. Such updating of the correction parameters is carried out when the steady-state values $U_0$, measured over a number of periods with the sampling integration time interval $T_x$, and the $U_0$ values which correspond to the measured values $U_0$ and are estimated using the k values are essentially constant, but differ from one another.

3rd Measurement mode

The particularly preferred third measurement mode differs from the first and second measurement modes in that, controlled by the control and evaluation device 12, the switching frequency of the field current I changes periodically between two frequencies, for example $f_1=25$ Hz and $f_2=6.25$ Hz.

Figure 5:
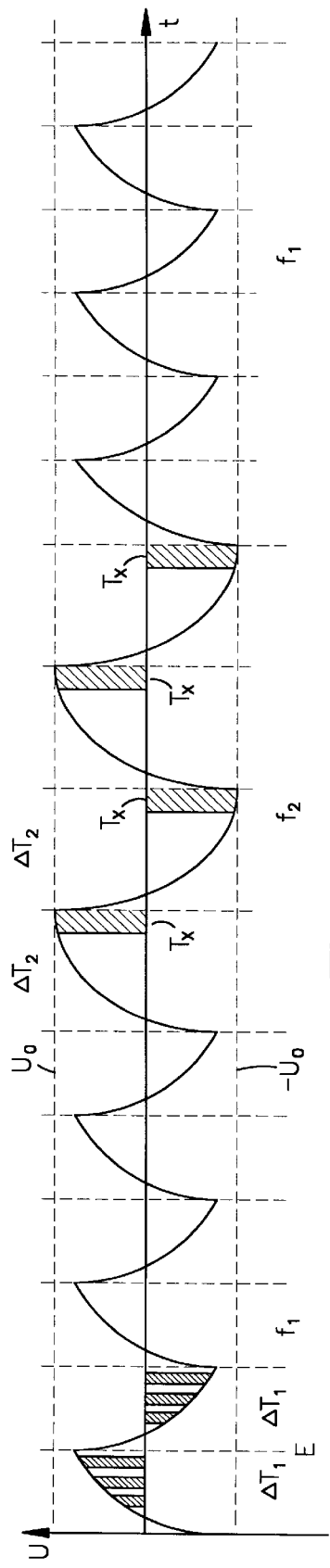
FIG. 5 uses an explanatory diagram to show the waveform of the measurement voltage when the magnetic field is produced using two mutually alternating excitation frequencies, and the possibility for recording calibration values.

In this case, the time waveform of the detection voltage U(t) at the input of the measured value integrator 20 is as sketched qualitatively in FIG. 5. As can be seen from FIG. 5, the current switching periods $2\Delta T_2$ at the lower frequency $f_2$ are so long that the voltage U(t) can in each case achieve its steady-state value $U_0$, while, in contrast, this is not the case for the higher frequency $f_1$.

The measured values can be detected by the measured value integrator 20 during the higher frequency phases in the manner described with reference to the first measurement mode or in the manner described with reference to the second measurement mode. During the longer current switching periods (frequency $f_2$), however, a voltage measured value is recorded (at least as well) exclusively in the steady-state range (cf. sampling integration time interval $T_x$). If these control values of the steady-state voltage $U_0$ and the corresponding estimated values $U_0$ are constant over a relatively long time period, but are different in a systematic manner, the measured control values $U_0$ are used to check the correction values $k_i$ and k which are used in the manner described above to estimate the $U_0$ values from the measurements at the higher current switching frequency $f_1$. Thus, if a comparison of the values $U_0$ measured in the steady state in each case at the frequency $f_2$ with the values for $U_0$ estimated during the measurement phases at the frequency $f_1$ shows that the correction factors $k_i$ need to be corrected, then the control and evaluation device 12 updates the correction factors $k_i$ as appropriate.

Overall, the measurement range and the zero of the measurements can be checked and, if required, corrected in this way.

4th Measurement mode

Figure 6:
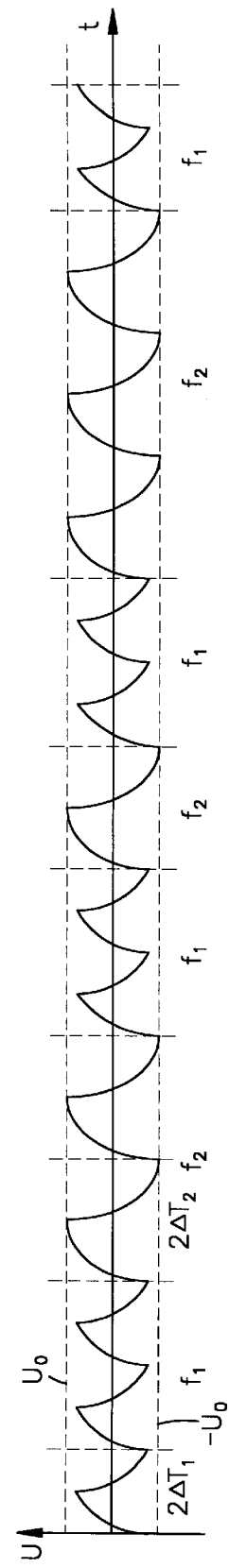
FIG. 6 uses an explanatory diagram to show the time waveform of the measurement voltage with the magnetic field being produced using two different, mutually alternating frequencies, the number of periods in the respective period cycles varying in an irregular manner.

The fourth measurement mode, which is explained with reference to FIG. 6, is likewise operated with at least two field current I switching frequencies $f_1$, $f_2$ which alternate with one another in time. The frequencies $f_1$ and $f_2$ have no mutual common harmonics. The lower frequency $f_2$ can be selected such that steady-states of the magnetic field B may occur in the associated half-cycles.

A special feature of the measurement mode No. 4 is now that the cycles with shorter periods ($f_1$) and longer periods ($f_2$) do not alternate with one another regularly and periodically. The number of exciter cycles at the two frequencies is determined randomly by means of a random number generator in the control and evaluation device 12, the maximum number of successive cycles at the same frequency being adjustably limited.

In the fourth measurement mode, the measured value detection and evaluation may be carried out in one of the manners described above or, possibly, exclusively by recording measured values in the respective steady-state region.

Producing the magnetic field in accordance with the fourth measurement mode has particular advantages for measuring flows which are subject to periodic flow fluctuations, as may be caused, for example, by piston-type pumps or the like in the feed circuit of the medium which can flow.

Specifically, if a periodically pulsating flow profile is sampled at a fixed frequency (or by two fixed frequencies which alternate with one another periodically), then the time synchronization of measured value detection and the periodic flow change can lead to a beat-frequency behavior and thus to a systematic error in the output signal, which preferably indicates a mean flow rate, of a magneto-inductive flowmeter.

Measurement operation according to the invention using the fourth measurement mode ensures that measured value detection is never synchronized to periodic flow changes over a relatively long period, so that long-term incorrect measurements are avoided. The magneto-inductive flowmeter operated using the fourth measurement mode and according to the invention produces a result which correctly reproduces the mean flow rate with periodically fluctuating flows.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for measuring the flow rate of a medium which can flow, by means of a magneto-inductive flowmeter, said magneto-inductive flowmeter having:

a measurement tube through which said medium flows, an electromagnetic coil arrangement operated with a field current from a pulsed DC source to produce a switched magnetic field which passes through said measurement tube essentially transversely with respect to its longitudinal axis, two electrodes for measuring a measurement voltage which is caused by the flow of said medium which can flow running transversely with respect to said magnetic field between said two measurement electrodes, and a measured value detection device for sampling said measurement voltage at clock time intervals of an applied coil current, said method comprising the steps of:

sampling said measurement voltage at clock time intervals of an applied current to said electromagnetic coil arrangement even during a time period in which the magnetic field, which attempts to reach a steady state in accordance with a characteristic time function after each coil field current changeover, has not yet reached the steady state, and evaluating said measurement voltage samples in order to estimate the flow rate of the medium which can flow, in said measurement tube.

2. The method of claim 1 wherein said sampling step includes the step of taking a plurality of samples of said measurement voltage during each of said clock time intervals, said sampling occurring in a predetermined timing relating to the respectively preceding switching of said switched magnetic field in order to estimate the flow rate, associated with the respective clock time intervals, of the medium which can flow.

3. The method of claim 2 further comprising the step of:

correcting each sample which is taken before said switched magnetic field reaches the steady state by a correction factor, which is dependent on the timing of said sample in said clock time interval, in order to normalize said samples to the situation when measurements are carried out with a steady-state magnetic field.

4. The method of claim 1 wherein said sampling step includes the step of taking one sample of said measurement voltage during each of said clock time intervals, said sampling occurring in a predetermined timing relating to the respectively preceding switching of said switched magnetic field, over a sampling integration time interval which extends over the majority of the entire clock time interval.

5. The method of claim 4 further comprising the step of:

correcting each sample using a correction factor which is dependent on the timing of said sample in said clock time interval and on the duration of said sampling integration time interval, in order to normalize said samples to the situation when measurements are taken exclusively in a steady-state magnetic field.

6. The method of claim 1 wherein said sampling step includes the step of sampling said measurement voltage at time intervals with a steady-state magnetic field and said measurement voltage samples so sampled are used as calibration values for checking and possibly correcting measurement voltage values from time intervals with a steady-state magnetic field.

7. The method of claim 6 wherein said coil field current is switched at at least two mutually alternating switching frequencies, said clock time intervals at one of these frequencies being sufficiently long for a steady-state magnetic field to be formed, and wherein calibration values are recorded at said at one of the frequencies clock time intervals.

8. The method of claim 4 wherein said sampling step includes the step of sampling said measurement voltage at time intervals with a steady-state magnetic field and said measurement voltage samples so sampled are used as calibration values for checking and possibly correcting measurement voltage values from time intervals with a steady-state magnetic field.

9. The method of claim 8 wherein said coil field current is switched at an essentially constant switching frequency, it being possible for said magnetic field to assume its steady state in each clock time interval, and wherein, in order to record said calibration values, said sampling integration time interval is reduced to a value which falls entirely in the time period of said steady-state magnetic field.

10. The method of claim 5 wherein said sampling step includes the step of sampling said measurement voltage at time intervals with a steady-state magnetic field and said measurement voltage samples so sampled are used as calibration values for checking and possibly correcting measurement voltage values from time intervals with a steady-state magnetic field.

11. The method of claim 10 wherein said coil field current is switched at an essentially constant switching frequency, it being possible for said magnetic field to assume its steady state in each clock time interval, and wherein, in order to record said calibration values, said sampling integration time interval is reduced to a value which falls entirely in the time period of said steady-state magnetic field.

12. The method of claim 1 wherein said coil current is switched at at least two different switching frequencies, which alternate with one another in time, and the number of periods of each of said two different alternating switching frequencies being varied in an irregular manner, and said measurement voltage is sampled with a predetermined time relationship from the respectively preceding field current switching time in the clock time intervals when the coil current is applied.

13. The method of claim 12 wherein said at least two different switching frequencies have no common harmonics.

14. The method of claim 13 wherein said number of periods of each of said two different alternating switching frequencies is determined from a predetermined numerical range by means of a random number generator.

15. The method of claim 1 wherein the flow direction of said coil field current is alternately reversed in time by said DC source, and said measurement voltage is sampled both in said clock time intervals assigned to one of said flow directions and in said clock time intervals assigned to the other of said flow directions in order to obtain information about said flow rate.

16. A magneto-inductive flowmeter for measuring the flow rate of a medium that can flow comprising:

a measurement tube through which said medium flows, an electromagnetic coil arrangement for producing a magnetic field transversely with respect to the flow direction of said medium in said measurement tube, two electrodes for measuring a measurement voltage which is caused by the flow of said medium which can flow running transversely with respect to said magnetic field, a measured value detection device comprising:

a DC source for providing a field current for said electromagnetic coil arrangement, a switch device which pulses said coil field current, a programmable control circuit which controls said switch device, a measured value integrator which samples said measurement voltage at clock time intervals which occur when said electromagnetic coil field current is applied, said sampling occurring even during a time period in which said magnetic field which attempts to reach a steady state in accordance with a characteristic time function after each changeover of said electromagnetic coil field current has not yet reached said steady state, and an evaluation device which evaluates said measurement voltage samples in order to determine said medium flow rate wherein the duration of said sampling integrator clock time intervals and/or the timing of the sampling integration time intervals relative to the switching times of said electromagnetic coil field current is adjustable under the control of said programmable time control circuit.

17. The magneto-inductive flowmeter of claim 16 wherein said switch device alternately switches the flow direction of said electromagnetic coil field current under the control of said programmable control circuit.

18. The magneto-inductive flowmeter of claim 16 wherein the switching frequency of said switch device is adjustable under the control of said programmable control circuit.

19. The magneto-inductive flowmeter of claim 16 wherein said programmable control device drives said switch device at at least two different switching frequencies which alternate with one another in time, wherein at least one of said at least two different switching frequencies is so small that the magnetic field in the associated clock time intervals when said coil current is applied assumes a steady state, and wherein said measured value integrator in each case records, by means of said evaluation device, at least one sample of said measurement voltage in the relevant clock time intervals with a steady-state magnetic field as a calibration value for checking and, if necessary, for correction during the clock cycles of the sample recorded at the other of said at least two different switching frequencies.

20. The magneto-inductive flowmeter of claim 16 wherein said measurement voltage is applied to said measured value integrator through a preamplifier and a filter which is controlled by said measured value detection device and has an adjustable cut-off frequency.

21. The magneto-inductive flowmeter of claim 20 wherein a variable gain amplifier, which is controlled by said measured value detection device, is connected downstream of said filter.

22. The magneto-inductive flowmeter of claim 16 wherein said measured value integrator outputs said measurement voltage samples as digital measured values to said evaluation device.

23. The magneto-inductive flowmeter of claim 16 wherein said programmable control circuit drives said switch device with period sequences which alternate with one another in time at at least two different switching frequencies, the number of periods in the respective period sequences varying irregularly.

24. The magneto-inductive flowmeter of claim 23 wherein said control circuit comprises a random number generator, which continuously selects the number of periods in the respective period sequences from a predetermined numerical range using a random selection procedure.

25. The magneto-inductive flowmeter of claim 23 wherein said at least two different switching frequencies have no common harmonics.

26. The magneto-inductive flowmeter of claim 24 wherein said at least two different switching frequencies have no common harmonics.

27. The magneto-inductive flowmeter of claim 16 wherein said programmable control device and said evaluation device are formed by a microcomputer.

* * * * *